United States Patent
Williams

(10) Patent No.: US 9,667,914 B2
(45) Date of Patent: May 30, 2017

(54) NONLINEAR SCALING IN VIDEO CONFERENCING

(71) Applicant: Herold Williams, Dayton, OH (US)

(72) Inventor: Herold Williams, Dayton, OH (US)

(*) Notice: Subject to any disclaimer, the term of this patent is extended or adjusted under 35 U.S.C. 154(b) by 0 days.

(21) Appl. No.: 15/150,533

(22) Filed: May 10, 2016

(65) Prior Publication Data

US 2016/0255306 A1    Sep. 1, 2016

Related U.S. Application Data

(63) Continuation of application No. 14/833,351, filed on Aug. 24, 2015, which is a continuation of application No. PCT/US2014/018137, filed on Feb. 25, 2014.

(60) Provisional application No. 61/768,587, filed on Feb. 25, 2013.

(51) Int. Cl.
| | |
|---|---|
| *H04N 7/14* | (2006.01) |
| *G06T 3/40* | (2006.01) |
| *H04N 1/387* | (2006.01) |
| *H04N 7/15* | (2006.01) |

(52) U.S. Cl.
CPC .............. *H04N 7/147* (2013.01); *G06T 3/40* (2013.01); *G06T 3/4092* (2013.01); *H04N 1/387* (2013.01); *H04N 7/15* (2013.01); *H04N 7/152* (2013.01); *G06T 2200/16* (2013.01); *G06T 2207/10016* (2013.01); *G06T 2207/30196* (2013.01)

(58) Field of Classification Search
CPC ...... G06K 9/42; G06K 2009/363; G06T 3/40; G06T 3/4007; G06T 3/0018; G06T 3/0093; G06T 3/4092; G06T 2207/30196; G06T 2207/10016; G06T 2200/16; H04N 5/2628; H04N 7/14; H04N 5/26281; H04N 7/15; H04N 7/152; H04N 7/147; H04N 1/387; H04N 7/141
USPC ......... 348/14.01, 14.08, 14.09; 382/298, 277
See application file for complete search history.

(56) References Cited

U.S. PATENT DOCUMENTS

| | | |
|---|---|---|
| 6,346,950 B1 | 2/2002 | Jouppi |
| 7,015,954 B1 | 3/2006 | Foote et al. |
| 7,149,367 B2 | 12/2006 | Cutler |

(Continued)

FOREIGN PATENT DOCUMENTS

| | | |
|---|---|---|
| KR | 10-1997-0706693 A | 11/1997 |
| WO | 96/14711 A1 | 5/1996 |
| WO | 2012170559 A2 | 12/2012 |

OTHER PUBLICATIONS

Kim, Seong Woo; Notification of Transmittal of the International Search Report and the Written Opinion of the International Searching Authority for PCT Application No. PCT/US2014/018137; date of mailing Jun. 23, 2014; Korean Intellectual Property Office; Republic of Korea.

(Continued)

*Primary Examiner* — Stella Woo
(74) *Attorney, Agent, or Firm* — Thomas E. Lees, LLC

(57) ABSTRACT

A method for video teleconferencing comprises receiving a starting image with a number of rows and a number of columns. The starting image is downscaled with a dual-axis warping function to create a scaled image with a number of rows fewer than the number of rows of the starting image and a number of columns fewer than the number of columns in the starting image. Then, a transmission image is created from the scaled image.

18 Claims, 8 Drawing Sheets

(56) References Cited

U.S. PATENT DOCUMENTS

| | | | |
|---|---|---|---|
| 7,184,609 B2* | 2/2007 | Liu .................... | G06K 9/00228 345/660 |
| 8,077,194 B2 | 12/2011 | Kenoyer et al. | |
| 2005/0143124 A1* | 6/2005 | Kennedy ............... | G06F 1/1626 455/556.1 |
| 2006/0125921 A1 | 6/2006 | Foote | |
| 2007/0120954 A1 | 5/2007 | Allen et al. | |
| 2008/0309751 A1* | 12/2008 | Lam ........................ | H04N 7/15 348/14.08 |
| 2010/0302446 A1 | 12/2010 | Mauchly et al. | |
| 2011/0216975 A1 | 9/2011 | Rother et al. | |
| 2011/0249073 A1* | 10/2011 | Cranfill .................. | H04N 7/147 348/14.02 |
| 2012/0050458 A1 | 3/2012 | Mauchly et al. | |
| 2012/0092517 A1 | 4/2012 | Wickstrom | |
| 2013/0083153 A1 | 4/2013 | Lindbergh | |
| 2013/0188045 A1 | 7/2013 | Kalevo | |
| 2016/0037085 A1* | 2/2016 | Mills .................... | H04N 5/2628 348/222.1 |

OTHER PUBLICATIONS

Wittmann-Regis, Agnes; Notification Concerning Transmittal of the International Preliminary Report on Patentability and the Written Opinion of the International Searching Authority for PCT Application No. PCT/US2014/018137; date of mailing Sep. 3, 2015; The International Bureau of WIPO; Geneva, Switzerland.

Woo, Stella L.; Final Office Action for U.S. Appl. No. 14/833,351; notification date Feb. 14, 2017; United States Patent and Trademark Office; Alexandria, VA.

* cited by examiner

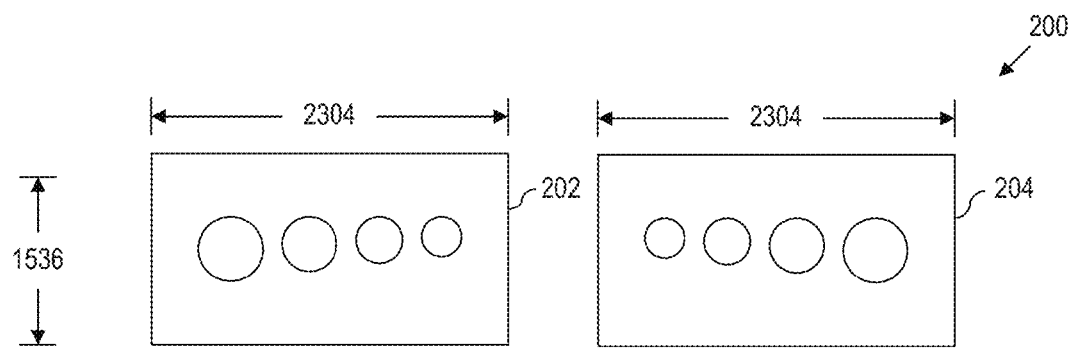
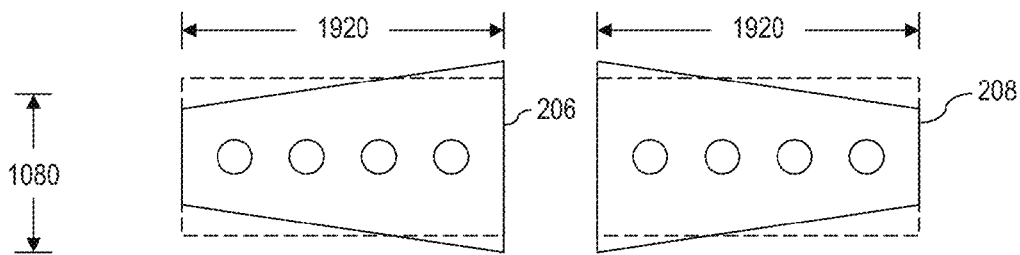

NONLINEAR SCALING IN VIDEO CONFERENCING

CROSS REFERENCE TO RELATED APPLICATIONS

This application is a continuation application of U.S. application Ser. No. 14/833,351 filed Aug. 24, 2015, entitled NONLINEAR SCALING IN VIDEO CONFERENCING, which is a bypass continuation of International Application No. PCT/US2014/018137, filed Feb. 25, 2014, entitled NONLINEAR SCALING IN VIDEO CONFERENCING, which claims the benefit of U.S. Provisional Patent Application Ser. No. 61/768,587, filed Feb. 25, 2013, entitled NONLINEAR SCALING IN VIDEO CONFERENCING, the disclosures of which are hereby incorporated by reference.

BACKGROUND

Various aspects of the present disclosure relate generally to teleconferencing and more particularly to compression of video for teleconferencing applications.

Conventional conferences involve locating participants at a common location (e.g., a conference room). However, in certain circumstances, it is not possible for all participants of a conference to be co-located within the same conference room. To address this scenario, video conferencing systems have been developed that take advantage of computer networks to transmit video and audio data between two or more geographically separate locations. Basically, the video conferencing system enables the participants at one location (i.e., a local endpoint) to see and hear the participants at a different, remote location (i.e., a remote endpoint).

In its most basic form, a video conferencing system equips each physically separate location (endpoint) participating in a video conference with a camera, microphone, video display, and speaker. The video camera captures video images of the participants at a corresponding local endpoint. The video conferencing system processes the captured video images (e.g., using compression) and transmits the processed video images to a remote endpoint, where the compressed video images are decompressed and displayed. Similarly, the microphone captures audio from the local endpoint, which is transmitted to the remote endpoint of the video conference. Analogously, the audio can be compressed for transmission and decompressed for audio playback at the remote endpoint.

The video display enables the participants at the local endpoint to view video captured at the remote endpoint. The display may also be utilized to view other forms of media, such as images, slide presentations, and video clips. Likewise, the speaker enables the participants at a local endpoint to hear audio captured by the microphone at the remote endpoint. The speaker may also be used to play media, such as audio files. As such, participants at each location of the video conference can see and hear the participants at the other location, as well as see and hear any other forms of media presented during the conference.

BRIEF SUMMARY

According to aspects of the present disclosure, a method for video teleconferencing comprises receiving a starting image with a number of rows and a number of columns. The starting image is downscaled with a dual-axis warping function to create a scaled image with a number of rows fewer than the number of rows of the starting image and a number of columns fewer than the number of columns in the starting image. Then, a transmission image is created from the scaled image.

BRIEF DESCRIPTION OF THE SEVERAL VIEWS OF THE DRAWINGS

FIGS. 2A-2I are block diagrams illustrating nonlinear down-scaling starting from a camera image to a transmission image, according to various aspects of the present disclosure, particularly:

FIGS. 2A and 2B are block diagrams illustrating a starting image;

FIGS. 2C and 2D are block diagrams illustrating applying a dual-axis warp process to the starting images of FIGS. 2A and 2B, respectively;

FIGS. 2E and 2F are block diagrams illustrating dividing up the images of FIGS. 2C and 2D, respectively;

FIGS. 2G and 2H are block diagrams illustrating performing down-scale processing of the images of FIGS. 2E and 2F, respectively;

FIG. 2I is a block diagram illustrating an exemplary combining of the images of FIGS. 2G and 2H, respectively;

DETAILED DESCRIPTION

A typical conference room that is set up as a video conferencing endpoint includes a display monitor that is positioned towards a first end of a conference room table. Participants of a video conference sit on either side of the table or otherwise sit around the table so as to face the display. Because the gaze of participants is often directed towards the display, a video camera is typically placed on top of the display so that an image of the faces (or at least the heads) of the participants in the conference room can be captured. The video images captured by the video camera are transmitted to another geographically remote endpoint location for display on a corresponding video screen. If a second video camera is added to a local endpoint (e.g., where a single video camera is insufficient to capture high quality images of all of the participants attending the video conference at the local endpoint) then the complexity of the video conferencing system greatly increases, typically resulting in the requirement of twice the number of codecs, connections and bandwidth usage at all endpoints.

However, according to aspects of the present disclosure, two video images may be transmitted by the video conferencing system using bandwidth required for only one image. As such, in video conferencing systems that use nonlinear scaling of the present invention and have two cameras per endpoint, the bandwidth to send the images from the cameras will be the same as if only one camera were used.

According to aspects of the present disclosure, nonlinear multi-band scaling (as will be described in greater detail below in reference to the figures) is utilized to process an image captured from a video conferencing camera such that different portions of the image are scaled with different scaling functions. For example, sections of the image that include more detailed information will be scaled less than other sections of the image. Thus, a method is provided that takes a starting image, breaks that starting image into sections, and scales the sections individually with different scaling functions. Within this document, the term "starting image" means "an image before that image is nonlinearly multi-band scaled." Thus, a "starting image" is an image that will be multi-band scaled at a later time and can include images that have also been previously processed (e.g., scaled, warped, cropped, or a combination thereof) and raw images directly from cameras.

Figure 1:
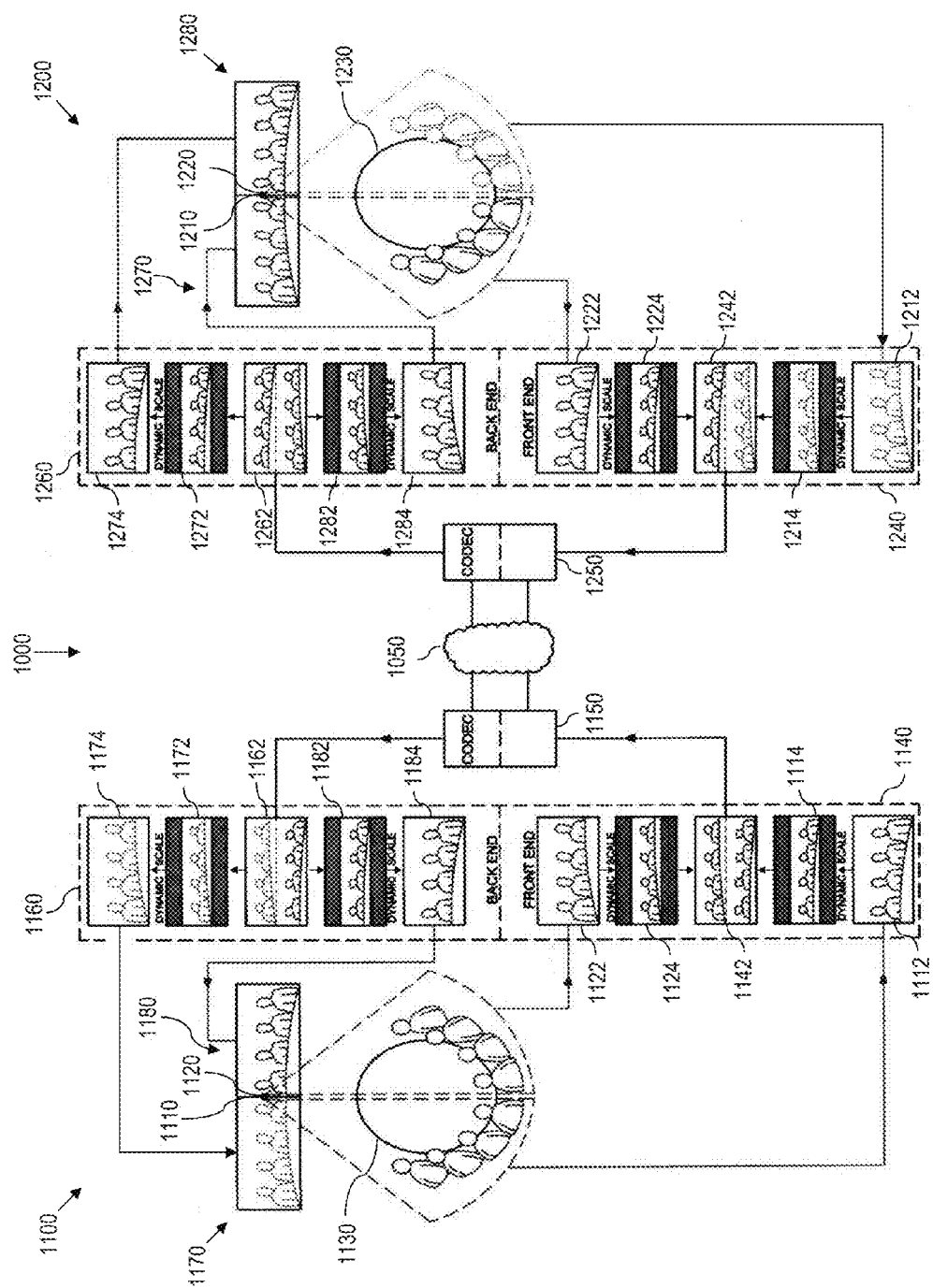
FIG. 1 is an illustration showing a video conferencing system using nonlinear scaling, according to various aspects of the present disclosure.

Referring to the figures, and in particularly FIG. 1, an illustration depicting a video conferencing system 1000 with two endpoints 1100, 1200 is shown. Within FIG. 1, reference numerals beginning with 11xx are associated with the first endpoint 1100 and reference numerals beginning with 12xx are associated with the second endpoint 1200.

The first endpoint 1100 includes two cameras 1110, 1120, each capturing an image (i.e., raw images) 1112, 1122, respectively, of one half of a conference table 1130. The images 1112, 1122 from the cameras 1110, 1120 are sent to a frontend system 1140 that nonlinearly down-scales the images to create multi-band scaled images 1114, 1124. The frontend system 1140 further combines the multi-band scaled images 1114, 1124 into a transmission image 1142 and sends the transmission image 1142 to a codec (i.e., encoder/decoder) 1150 for transmission over a network 1050.

Likewise, the second endpoint 1200 includes two cameras 1210, 1220, each capturing an image 1212, 1222, respectively, of one half of a conference table 1230. The images 1212, 1222 from the cameras 1210, 1220 are sent to a frontend system 1240 that nonlinearly down-scales the images to create multi-band scaled images 1214, 1224. The frontend system further 1240 combines the multi-band scaled images 1214, 1224 into a transmission image 1242 and sends the transmission image 1242 to a codec 1250 for transmission over the network 1050.

The frontend systems 1140, 1240 may also perform a dual-axis image equalization process in addition to the nonlinear multi-band scaling process. The dual-axis image equalization process is explained in greater detail in International Application No. PCT/US2012/041135 entitled "DUAL-AXIS IMAGE EQUALIZATION IN VIDEO CONFERENCING" filed on Jun. 6, 2012 on behalf of Herold Williams and Array Telepresence, Inc., and the entirety of that International Application is hereby incorporated by reference. When performed, the dual-axis equalization (i.e., dual-axis warping) may be performed serially to the nonlinear scaling or the dual-axis equalization may be performed concurrently with the nonlinear scaling.

The codecs 1150, 1250 encode the transmission images 1142, 1242, respectively, for transmission over the network 1050. Further, the codecs may also perform other processing such as compressing the transmission images. Thus, the codec 1150 of the first endpoint 1100 encodes the transmission image 1142 to send to the second endpoint 1200 and vice versa.

The codec 1150 of the first endpoint 1100 receives the transmission image of the second endpoint from the network 1050 and decodes the received image 1162 for a backend system 1160. The backend system 1160 divides (i.e., separates) the received image 1162 into scaled images 1172, 1182 for two displays 1170, 1180 and performs an inverse nonlinear scaling equation (i.e., up-scaling) on each multi-band scaled image 1172, 1182 to create display images 1174, 1184 (i.e., up-scaled images). The displays 1170, 1180 then display those display images 1174, 1184 for people at the first endpoint 1100.

Similarly, the codec 1250 of the second endpoint 1200 receives the transmission image of the first endpoint from the network 1050 and decodes the received image 1262 for a backend system 1260. The backend system 1260 divides the received image 1262 into scaled images 1272, 1282 for two displays 1270, 1280 and performs an inverse nonlinear scaling equation (i.e., up-scaling) on each scaled image 1272, 1282 to create display images 1274, 1284 (i.e., up-scaled images). The displays 1270, 1280 then display those display images 1274, 1284 for participants at the second endpoint 1200.

Figures 2E, 2F:
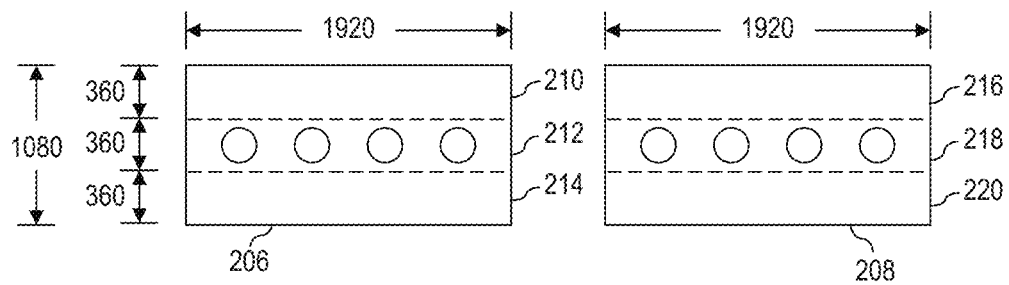

Referring now to FIGS. 2A-2I, an exemplary method 200 for performing a nonlinear down-scaling equation is shown by illustrating images at different points in the method 200. The method 200 may be utilized for instance, in the teleconferencing system of FIG. 1. Referring initially to FIGS. 2A and 2B, in this example, the cameras at one endpoint (e.g., cameras 1110 and 1120 at endpoint 1100 of FIG. 1) each produce an image that is 2304 columns×1536 rows of pixels. Therefore, starting out, raw images 202, 204 are 2304×1536 pixels. In the illustrative example, the corresponding displays (e.g., displays 1270 and 1280 at endpoint 1200 of FIG. 1) can display a 1920×1080 pixel image.

Referring to FIGS. 2C and 2D, the dual-axis warping described in International Application No. PCT/US2012/041135 is optionally applied to the image 202 to produce a first starting image 206 with a first number of columns and rows (e.g., 1920×1080 pixels in this example). Similarly, the dual-axis warping is optionally applied to the image 204 to produce a second starting image 208 with a second number of columns and rows (e.g., also 1920×1080 pixels in this example). In practice, the number of columns, rows or both can be the same or different between the first and second starting images. Because of the video camera positioning relative to the participants, there can be a depth of field disparity between participants that are seated close to the video camera relative to participants seated far away from the video camera. The resulting differences in perspective cause the participants at the near end of the table closest to the video camera to appear much larger than the participants at the far end of the table (i.e., farthest away from the video camera). The dual-axis warping can serve to scale the image as well as perform image equalization processing that adjusts the perspective of the captured image data such that each participant, regardless of their seating position at the conference table, appears in the image to be of similar size. Stated another way, the image equalization distorts the image in a way intended to "undo" the image artifacts caused by depth of field effects that make objects appear smaller than they actually are as the object is positioned further back in the scene captured by the image.

For instance, in FIGS. 2A-2B, the circles may represent the heads of participants. In FIG. 2A, the camera would be to the right of the image. Likewise, in FIG. 2B, the camera would be to the left. Notably, the perspective of the cameras causes the represented participants in FIGS. 2A and 2B to be larger the closer that participant is to the camera. However, in FIG. 2C, the relative size of the participants has been equalized relative to FIG. 2A. Likewise, in FIG. 2D, the relative size of the participants has been equalized relative to FIG. 2B. Moreover, the image resolution has been adjusted from 2304×1536 to 1920×1080.

Referring to FIGS. 2E and 2F, in this example, the first starting image 206 is divided into three sections (i.e., bands) 210, 212, 214, and each section is 1920×360 pixels in height. Likewise, for sake of example, the second starting image 208 is divided into three sections (i.e., bands) 216, 218, 220, and each section is 1920×360 pixels. However, the division of a starting image into two or more bands does not have to be even. Rather, the starting image can be divided up into many bands, each having unique dimensions if so desired.

The middle section 212 is determined to be an area of interest of the first starting image 206, so a scaling function that does not reduce the number of rows of pixels by too much is chosen for that section. However, the outer sections 210, 214 are to be scaled more to make up for the relatively low amount of scaling in the middle section 212. An analogous set of considerations is applied to the second starting image 208, where the middle section is 218 is determined to be an area of interest so the middle section 218 will have less scaling than the outer sections 216 and 220.

Figures 2G, 2H:
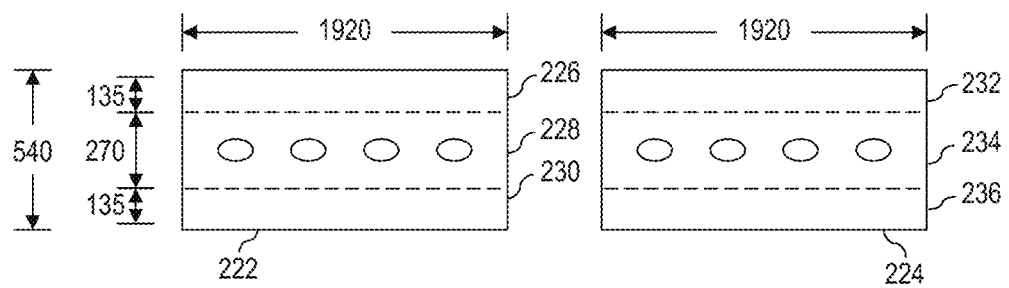

Referring to FIGS. 2G and 2H, for example, for the first starting image 206, a scaling function that scales down the image to have three-fourths the number of rows of pixels is applied to the middle section 212, and a scaling function that scales down the image to have three-eighths the number of rows of pixels is applied to the outer sections 210, 214. Thus, in a first multi-band scaled image 222 the scaled middle section 228 has two-hundred-and-seventy (270) rows of pixels, and the outer scaled sections 226, 230 both have one-hundred-and-thirty-five (135) rows of pixels. Therefore, the first multi-band scaled image 222 is 1920×540 pixels. Thus, the number of pixels of the multi-band scaled image 222 is half of the number of pixels of the starting image 206 in this illustrative example. Likewise, for the second starting image 208, a scaling function is applied that is analogous to that applied to the first starting image 206. Thus, in a second multi-band scaled image 224 the scaled middle section 234 has two-hundred-and-seventy (270) rows of pixels, and the outer scaled sections 232, 236 both have one-hundred-and-thirty-five (135) rows of pixels. Therefore, the second multi-band scaled image 224 is also 1920×540 pixels.

However, in the multi-band scaled images, the area of interest (e.g., the middle section) retains more actual pixels than other areas (e.g., the outer sections). Therefore, when up-scaling the area of interest, there is, on average, only one row out of four to up-scale. Further, the other areas are not just cropped off; they can also be up-scaled albeit with less resolution than the area of interest.

Further, if there were only one section in the image and the image were scaled with a continuous, linear equation, then that image would be considered linearly scaled. However, according to aspects of the present disclosure, an image is divided into more than one section, and at least one section is scaled differently than other sections; therefore the image including more than one section scaled with a nonlinear equation (either continuous or non-continuous) would be nonlinearly scaled. The starting image may also be divided into more than three sections. For example, the number of sections can be the number of rows in the starting image or the scaled image. As such the height of each section would be one row. In that case, each row can be scaled differently than a previous or subsequent row. Thus, the entire starting image can be nonlinearly scaled.

Figure 2I:
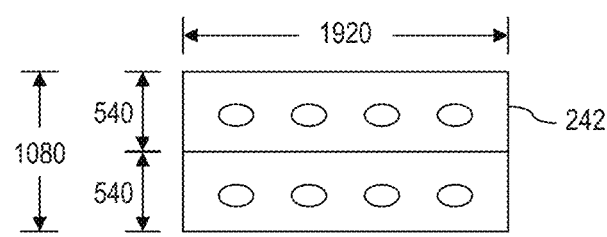

Referring now to FIG. 2I, the two scaled images 222, 224 are combined to produce one transmission image 242 that is 1920×1080 pixels by stacking the first scaled image 222 on top of the second scaled image 224, or vice versa. The transmission image 242 is sent to a single codec for encoding and for transmission to the other endpoint. Once on the other endpoint, the images are up-scaled and displayed on separate displays, as described with reference to FIG. 1.

Note that the down-scaling described herein is not a "compression" algorithm performed by the codec. The down-scaling (i.e., reducing the overall number of rows) occurs before the image reaches the codec. However, the codec may process the combined scaled images further if desired (e.g., the codec can compress the transmission image with a standard compression algorithm).

The area of interest may be predefined or may be determined at the time of scaling. Further, the images may be divided up into any number of sections for scaling. Moreover, the sections do not necessarily need to be created horizontally. In some applications, the identified area of interest may result in dividing the starting image into vertical sections. Moreover, the area of interest may cross over several sections. For example in an image with 1080 sections (one for each row in the starting image), the area of interest may be 540 sections high.

Still further, any number of images may be used as inputs to the process (i.e., more than the two images described in FIGS. 2A and 2B), and the dual-axis warping (e.g., as described with reference to FIGS. 2C and 2D) is not required. However, aspects of the present disclosure prefer that the transmission image (i.e., combined scaled images) be the same resolution as the displays at the other endpoint; however identical resolution of the transmission image and displays is not required.

Figure 3:
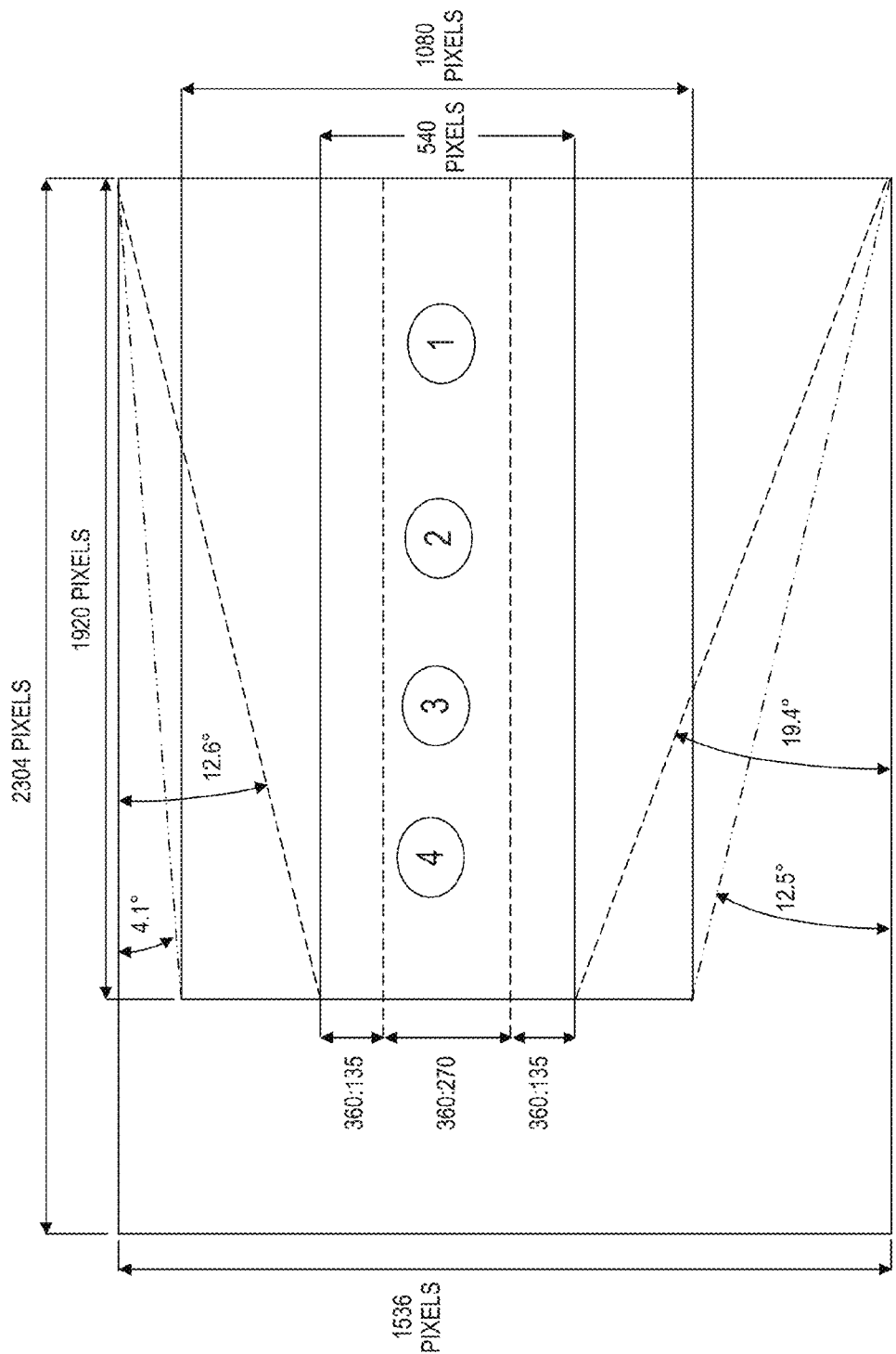
FIG. 3 is an illustration showing an exemplary dual-axis warping function performed concurrently with an exemplary nonlinear down-scaling function, according to various aspects of the present disclosure.

Turning now to FIG. 3, an exemplary dual-axis warping concurrent with nonlinear multi-band scaling is shown. A raw camera image starts out at 2304×1536 pixels. A processor performs a dual-axis warping (described in greater detail in International Application No. PCT/US2012/041135 as mentioned above), which would normally result in an image that is 1920×1080 pixels (e.g., the bottom left corner of the warped image at a 12.5 degree angle from the bottom right pixel of the raw image and the top left corner of the warped image at a 4.1 degree angle from the top left corner of the raw image).

For ease of understanding, the exemplary concurrent nonlinear scaling functions are as follows: the top third and bottom third are scaled to 135 rows and the middle third is scaled to 270 rows. Thus, the resulting scaled image is 540 rows (i.e., half of 1080 rows). Thus, with the exemplary dual-axis warping function and the exemplary scaling functions, the resulting scaled image has a bottom left corner at a 19.4 degree angle from the bottom right pixel of the raw image and a top left corner of the scaled image at a 12.6 degree angle from the top left corner of the raw image. As such, the warping and scaling can occur serially (e.g., as described with reference to FIGS. 2A-2I) or concurrently (e.g., as described with reference to FIG. 3).

Figure 4:
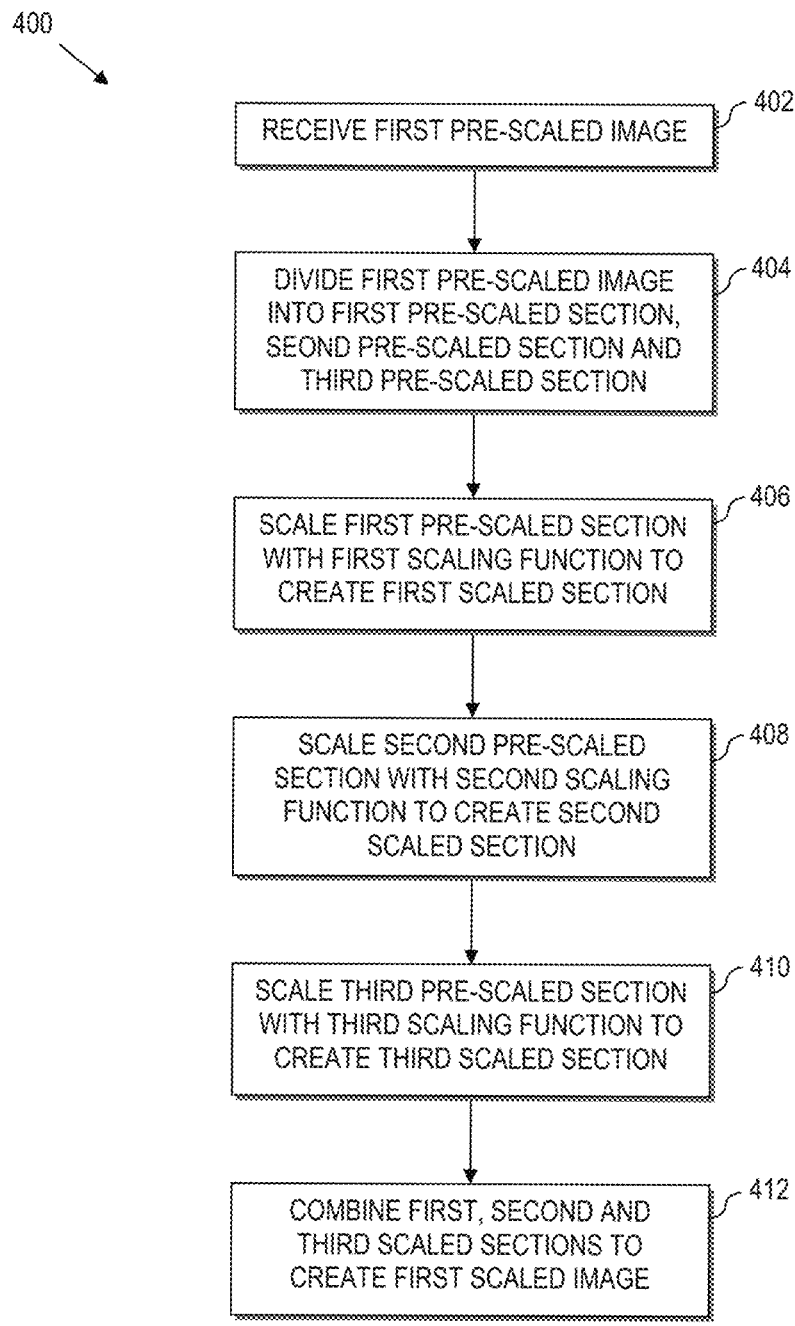
FIG. 4 is a flow chart illustrating a method of nonlinear scaling, according to various aspects of the present disclosure.

Referring now to FIG. 4, an exemplary, simplified method 400 for nonlinear down-scaling is shown. At 402, a first starting image is received. The first starting image is an image that will be nonlinearly scaled according to aspects of the method 400. For example, the first starting image may be a raw image directly from a camera, a warped image from a dual-axis warping function, an already-scaled image that is to be scaled again, a cropped image, combinations thereof, etc.

At 404, the first starting image is divided into bands (i.e., sections). For instance, as illustrated with reference to FIGS. 2A-2I and FIG. 3, the first starting image is divided into a first starting section, a second starting section, and a third starting section. The dividing can be horizontal (such that the number of columns for each section is the same as the number of columns of the image) or vertical (such that the number of rows for each section is the same as the number of rows of the image). Further, the resulting sections may all be the same size or may be different sizes. Moreover, the determination of the sizes, shapes, or both of the sections may be dependent on identifying an area of interest (or areas of interest) within the image. An area of interest may be constant for every image (i.e., predetermined) or may vary depending on the image.

At 406, the first starting section is down-scaled with a first scaling equation to create a first scaled section. Similarly, at 408, the second starting section is down-scaled with a second scaling equation to create a second scaled section. Likewise, at 410, the third starting section is down-scaled with a third scaling equation to create a third scaled section. The scaling functions may be identical, different, or mixed. For example, the second and third scaling equation may be identical, while the first scaling equation is different from the second and third scaling functions. Another example has the first and third scaling equations identical, while the second scaling equation is different from the other two. For example, the second scaling equation may reduce the number of rows to three-fourths the number of rows, and the first and third scaling equations may reduce the number of rows to three-eighths of the number of rows.

As mentioned above, the dividing into three sections is just an example and used to illustrate the process. However, more sections may be used, limited only by the number of rows in the starting image or the number of rows in the scaled image.

At 412, the first scaled section, second scaled section, and third scaled section are combined to create a first scaled image. The combination of the sections may depend on the division of the starting image. For example, if the starting image were divided horizontally at 404, then the scaled sections would be stacked vertically to create the scaled image at 412. Alternatively, if the starting image were divided vertically at 404, then the scaled sections would be stacked side-by-side to create the scaled image at 412.

In some cases, a second starting image goes through a similar process 400 to create a second scaled image. Then the first scaled image and second scaled image are combined to create a transmission image that is encoded and sent to another location. The scaled images are up-scaled at the other location with minimal distortion of the resolution of the final image for display.

Thus, with certain scaling functions, two images may be scaled to use only half the number of pixels and thus half of the information to be transmitted. Therefore, two images may be combined into one image and transmitted, requiring bandwidth associated with only one image. Thus, two cameras feeding a single encoder at one endpoint can send images using only the bandwidth associated with sending one image normally.

Figure 5:
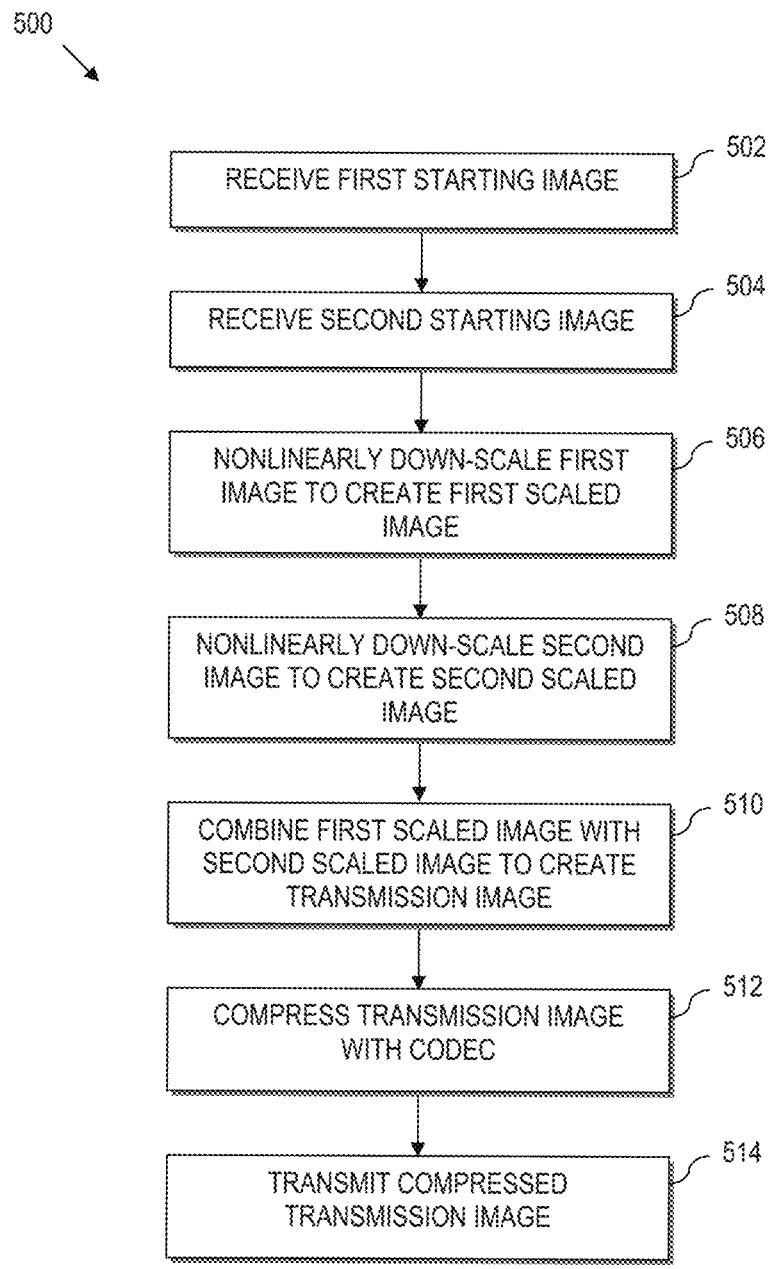
FIG. 5 is a flow chart illustrating a method for video teleconferencing up to transmitting an image, according to various aspects of the present disclosure.
Figure 6:
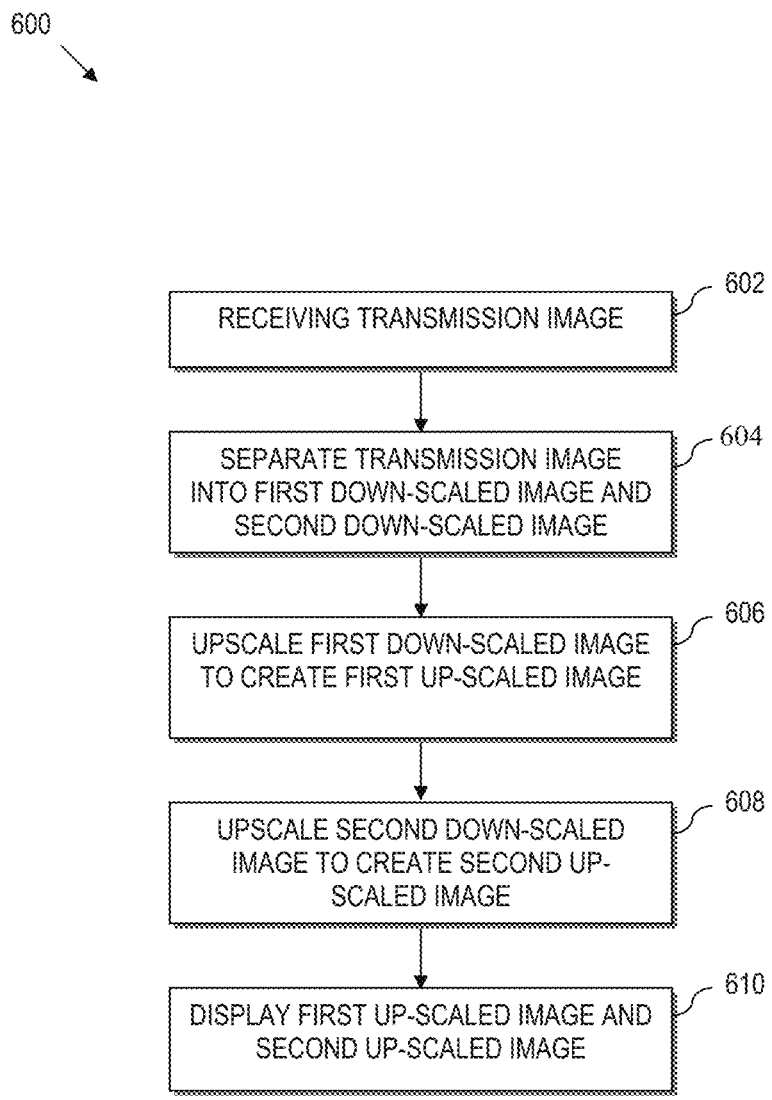
FIG. 6 is a flow chart illustrating a method for video teleconferencing from receiving the transmitted image from FIG. 5, according to various aspects of the present disclosure.

FIGS. 5-6 illustrate a method for video conferencing. Specifically, FIG. 5 illustrates preparing images for transmission, and FIG. 6 illustrates receiving transmitted images and displaying those images.

Turning specifically to FIG. 5, a method 500 for preparing messages for transmission in video teleconferencing is shown. A first starting image and a second starting are received at 502 and 504 respectively. As mentioned above, the starting images may be raw images directly from cameras or images that have been previously processed (e.g., scaled, warped, cropped, etc., or combinations thereof).

The first starting image is nonlinearly down-scaled to create a first scaled image at 506. Likewise, the second starting image is nonlinearly down-scaled to create a second scaled image at 508. As such, the starting images are down-scaled using a nonlinear down-scaling equation.

Further, the down-scaling may also include a dual-axis warping, as described in International Application No. PCT/US2012/041135. As such, the dual-axis warping may be performed serially (i.e., before or after) with the down-scaling. In other words, the down-scaling/dual-axis warping process may include two (or more) equations: at least one nonlinear equation (several linear or nonlinear equations may be combined to create one nonlinear continuous equation or nonlinear non-continuous equation) for down-scaling and at least one equation for dual-axis warping. Alternatively, the dual-axis warping may be performed concurrently with the down-scaling. In other words, there may be one equation that implements both dual-axis warping and down-scaling, there may be more than one equation running concurrently: at least one equation for down-scaling and at least one equation for dual-axis warping, or there may be a combination thereof.

The scaled images will have fewer rows per image than the starting images, because the starting images are down-scaled to create the scaled image. In some instances, the down-scaling equation produces a scaled image with half the number of rows as the starting image. However, any number of resulting rows is acceptable, as long as the number of rows in the scaled image is less than the number of rows in the starting image. If the down-scaling is performed vertically, then the number of columns of the scaled image will be less than the number of columns of the starting images, but the number of rows will not necessarily be less (depending on whether dual-axis warping is also performed).

At 510, the first scaled image and the second scaled image are combined to create a transmission image. For example, the second scaled image may be placed on top of the first scaled image (or vice versa) such that the resulting transmission image has a number of rows equal to the number of rows of the first scaled image plus the number of rows of the second scaled image. If vertical down-scaling is used, then the scaled images may be placed side-by-side such that the transmission image has a number of columns as the sum of the columns of the first and second scaled images.

At 512, the transmission image is compressed by a codec for transmission. The down-scaling and compression are not the same process. For example, the nonlinear down-scaling is not a standard compression algorithm (e.g., H.264, H.265, etc.). Further, the down-scaling may be implemented independently of the codec used for compression and before compression occurs. The compressed transmission image is then transmitted at 514. In implementations without compression, the transmission image is transmitted without compression.

In FIG. 6, a method 600 for receiving and displaying images for video teleconferencing is shown. At 602 the transmission image that was transmitted at 514 of FIG. 5 is received. If the transmission image was compressed before transmission, then the compressed transmission image is decompressed after receipt.

At 604, the received transmission image is separated into a first down-scaled image and a second down-scaled image. If the transmission image was not compressed or if the transmission image was compressed with a lossless compression algorithm, then the first down-scaled image should be identical to the first scaled image created in 506 of FIG. 5 and the second down-scaled image should be identical to the second scaled image created in 508 of FIG. 5. However, there may be minor differences between the images stated above if the transmission image was compressed using a lossy algorithm.

The first down-scaled image is up-scaled to create a first up-scaled image at 606, and the second down-scaled image is up-scaled to create a second up-scaled image at 608. For example, the images may be up-scaled using an equation that is the inverse of the equation used for down-scaling. Alternatively, an up-scaling equation independent of the down-scaling equation can be used if desired. If dual-axis warping was performed, then the dual-axis warping remains. As with the down-scaling, the up-scaling is performed independently of the codec.

At 610, the first and second up-scaled images are displayed. For example, the first up-scaled image is displayed on a first display, and the second up-scaled image is displayed on a second display.

Figure 7:
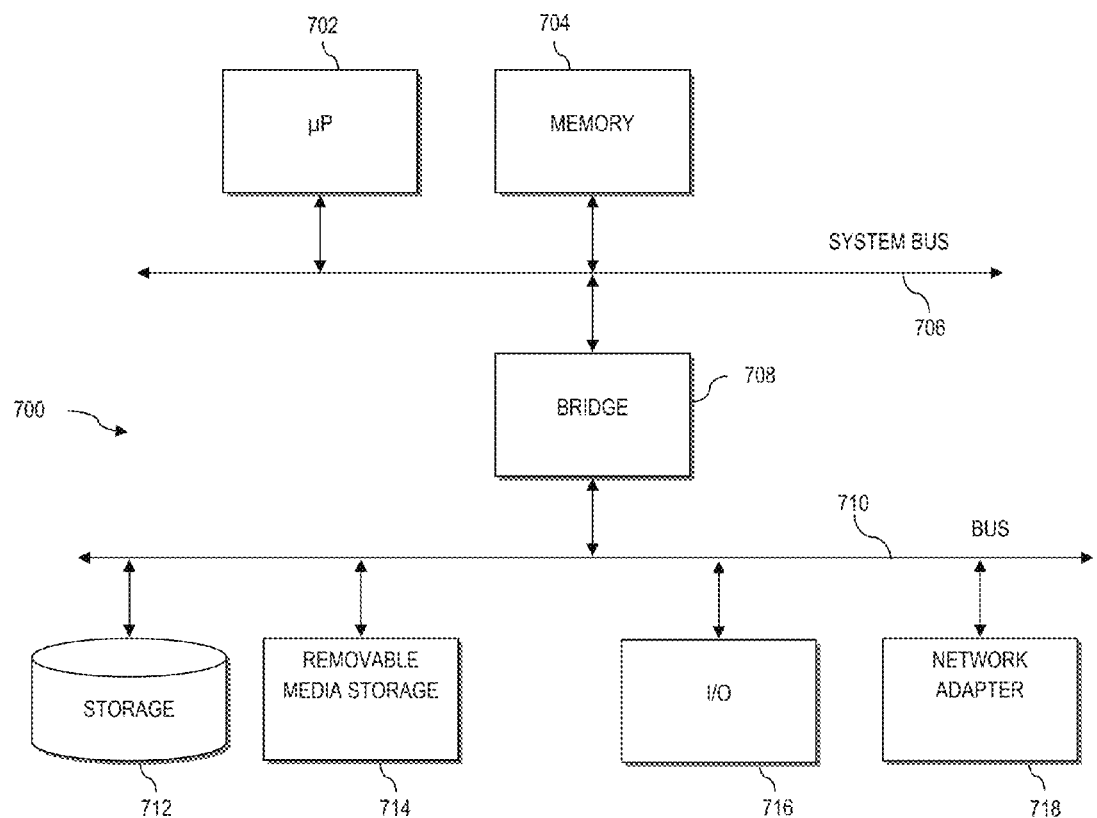
FIG. 7 is a block diagram of a computer system having a computer readable storage medium for implementing functions according to various aspects of the present disclosure.

Referring to FIG. 7, a block diagram of a data processing system is depicted in accordance with the present invention. The data processing system may implement the front end (e.g., 1140, 1240 of FIG. 1), the back end (e.g., 1160, 1260 of FIG. 1), the codecs (e.g., 1150, 1250 of FIG. 1), or combinations thereof. The data processing system may also be used to implement any of the methods described more fully herein. The data processing system 700 includes one or more processors 702 that are connected to memory 704 via a system bus 706. The processor(s) 702 may comprise microprocessors, a symmetric multiprocessor (SMP) system, special purpose or specially programmed devices such as an Application Specific Integrated Circuit (ASIC), Field Programmable Gate Array (FPGA), etc. A bridge 708 connects the system bus 706 to an I/O Bus 710 that links peripheral devices to the processor(s) 702. Peripherals may include storage 712, such as a hard drive, removable media storage 714, e.g., floppy, flash, CD and/or DVD drive, I/O device(s) 716 such as a keyboard, mouse, etc. and a network adapter 718. The memory 704, storage 712, removable media insertable into the removable media storage 714 or combinations thereof, can be used to implement the methods, configurations, interfaces and other aspects set out and described herein with regard to FIGS. 1-6.

As will be appreciated by one skilled in the art, aspects of the present disclosure may be embodied as a system, method or computer program product. Accordingly, aspects of the present disclosure may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present disclosure may take the form of a computer program product embodied in one or more computer readable storage medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: a portable computer diskette, a hard disk, a random access memory (RAM), a read-only memory (ROM), an erasable programmable read-only memory (EPROM), Flash memory, an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device. A computer readable storage medium explicitly does not include anything defined as a computer readable signal medium.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device. As such, a computer readable storage medium is mutually exclusive from a computer readable signal medium.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present disclosure may be written in any combination of one or more programming languages, including an object oriented programming language (e.g., Java, Smalltalk, C++, etc.), conventional procedural programming languages (e.g., the "C" programming language or similar programming languages), and a hardware description language (e.g., Verilog, VHDL (VHSIC (Very High Speed Integrated Circuit) Hardware Description Language), AHDL (Altera Hardware Description Language), etc.). The program code may execute entirely on the user's data processing system, partly on the user's data processing system, as a stand-alone software package, partly on the user's data processing system and partly on a remote data processing system (e.g., combination of the front end 1140 and backend 1260 of FIG. 1) or entirely on the remote data processing system or a server. In the latter scenario, the remote data processing system may be connected to the user's data processing system through any type of network, including a local area network (LAN) or a wide area network (WAN), or the connection may be made to an external computer (for example, through the Internet using an Internet Service Provider).

Aspects of the present disclosure are described herein with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices (e.g., field programmable gate arrays (FPGA), complex programmable logic devices (CPLD), etc.) to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices (FPGAs, CPLDs, etc.) to cause a series of operational steps to be performed on the computer, other programmable apparatus, or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting of the invention. As used herein, the singular forms "a," "an" and "the" are intended to include the plural forms as well, unless the context clearly indicates otherwise. It will be further understood that the terms "comprises," "comprising," "includes," and/or "including" when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. Aspects of the invention were chosen and described in order to best explain the principles of the invention and the practical application, and to enable others of ordinary skill in the art to understand the invention for various embodiments with various modifications as are suited to the particular use contemplated.

What is claimed is:

1. A method for video teleconferencing, the method comprising:
   receiving a starting image with a number of rows and a number of columns;
   down-scaling, with a processor, the starting image to create a scaled image with a number of rows fewer than the number of rows of the starting image and a number of columns fewer than the number of columns in the starting image, wherein the down-scaling includes a dual-axis warping and further comprises:
      identifying an area of interest in the starting image;
      determining a first band in the starting image, wherein the first band includes a number of columns equal to the number of columns in the starting image, and the identified area of interest is within the first band;
      determining a second band in the starting image, wherein the second band includes a number of columns equal to the number of columns in the starting image, and the identified area of interest is outside the second band;
      down-scaling the first band at a first ratio to reduce a number of rows in the first band; and
      down-scaling the second band at a second ratio to reduce a number of rows in the second band, wherein the second ratio reduces the number of rows in the second band more than the first ratio reduces the number of rows in the first band; and
   creating a transmission image from the scaled image.

2. The method of claim 1 further including:
   compressing the transmission image; and
   transmitting the compressed transmission image.

3. The method of claim 2, wherein:
   compressing the transmission image includes compressing the transmission image with a codec; and
   down-scaling the starting image includes down-scaling the starting image independently of the codec.

4. The method of claim 1 further including:
   transmitting the transmission image;
   receiving the transmitted transmission image;
   creating a down-scaled image from the received transmission image;
   up-scaling the down-scaled image to create a first up-scaled image; and
   displaying the up-scaled image.

5. The method of claim 4 further including:
   compressing the transmission image with a first codec, wherein the compressing occurs after the down-scaling; and
   decompressing the received transmission image with a second codec, wherein the decompressing occurs before the up-scaling.

6. The method of claim 4, wherein:
   down-scaling the first starting image further includes down-scaling the starting image with a nonlinear down-scaling equation; and up-scaling the first down-scaled image further includes up-scaling the down-scaled image using an inverse of the nonlinear down-scaling equation.

7. The method of claim 1, wherein:
performing dual-axis scaling on the starting image occurs concurrently with down-scaling the starting image.

8. The method of claim 1, wherein:
performing dual-axis scaling on the starting image occurs serially to down-scaling the starting image.

9. The method of claim 1, wherein:
down-scaling the starting image includes down-scaling the starting image to create the first scaled image with a number of rows equal to half of the number of rows of the first starting image.

10. A computer readable storage device with an executable program for video teleconferencing stored thereon, wherein the program instructs a processor to perform:
receiving a starting image with a number of rows and a number of columns;
down-scaling, with a processor, the starting image to create a scaled image with a number of rows fewer than the number of rows of the starting image and a number of columns fewer than the number of columns in the starting image, wherein the down-scaling includes a dual-axis warping and further comprises:
identifying an area of interest in the starting image;
determining a first band in the starting image, wherein the first band includes a number of columns equal to the number of columns in the starting image, and the identified area of interest is within the first band;
determining a second band in the starting image, wherein the second band includes a number of columns equal to the number of columns in the starting image, and the identified area of interest is outside the second band;
down-scaling the first band at a first ratio to reduce a number of rows in the first band; and
down-scaling the second band at a second ratio to reduce a number of rows in the second band, wherein the second ratio reduces the number of rows in the second band more than the first ratio reduces the number of rows in the first band; and
creating a transmission image from the scaled image.

11. The computer readable storage device of claim 10 further including:
compressing the transmission image; and
transmitting the compressed transmission image.

12. The computer readable storage device of claim 11, wherein:
compressing the transmission image includes compressing the transmission image with a codec; and
down-scaling the starting image includes down-scaling the starting image independently of the codec.

13. The computer readable storage device of claim 10 further including:
transmitting the transmission image;
receiving the transmitted transmission image;
creating a down-scaled image from the received transmission image;
up-scaling the down-scaled image to create a first up-scaled image; and
displaying the up-scaled image.

14. The computer readable storage device of claim 13 further including:
compressing the transmission image with a first codec, wherein the compressing occurs after the down-scaling; and
decompressing the received transmission image with a second codec, wherein the decompressing occurs before the up-scaling.

15. The computer readable storage device of claim 13, wherein:
down-scaling the first starting image further includes down-scaling the starting image with a nonlinear down-scaling equation; and
up-scaling the first down-scaled image further includes up-scaling the down-scaled image using an inverse of the nonlinear down-scaling equation.

16. The computer readable storage device of claim 10, wherein:
performing dual-axis scaling on the starting image occurs concurrently with down-scaling the starting image.

17. The computer readable storage device of claim 10, wherein:
performing dual-axis scaling on the starting image occurs serially to down-scaling the starting image.

18. The computer readable storage device of claim 10, wherein:
down-scaling the starting image includes down-scaling the starting image to create the first scaled image with a number of rows equal to half of the number of rows of the first starting image.

* * * * *